(12) United States Patent
Claus et al.

(10) Patent No.: US 12,022,603 B2
(45) Date of Patent: Jun. 25, 2024

(54) GENERATOR FOR SPECTROMETRY

(71) Applicant: Analytik Jena GmbH, Jena (DE)

(72) Inventors: Frank Claus, Bucha (DE); Andreas Bielert, Rudolstadt (DE)

(73) Assignee: Analytik Jena GmbH+Co. KG, Jena (DE)

( * ) Notice: Subject to any disclaimer, the term of this patent is extended or adjusted under 35 U.S.C. 154(b) by 303 days.

(21) Appl. No.: 17/362,041

(22) Filed: Jun. 29, 2021

(65) Prior Publication Data

US 2022/0007490 A1 Jan. 6, 2022

(30) Foreign Application Priority Data

Jul. 1, 2020 (DE) ...................... 10 2020 117 402.0

(51) Int. Cl.
| | | |
|---|---|---|
| *H05H 1/46* | (2006.01) |
| *G01N 21/67* | (2006.01) |
| *H01J 49/10* | (2006.01) |

(52) U.S. Cl.
CPC ........... *H05H 1/4652* (2021.05); *G01N 21/67* (2013.01); *H01J 49/105* (2013.01)

(58) Field of Classification Search
None
See application file for complete search history.

(56) References Cited

U.S. PATENT DOCUMENTS

| | | | | |
|---|---|---|---|---|
| 7,214,934 B2 * | 5/2007 | Stevenson | ................ | H05H 1/36 |
| | | | | 250/300 |
| 8,025,775 B2 * | 9/2011 | Tuymer | ............ | H01J 37/32045 |
| | | | | 363/124 |
| 8,817,509 B2 * | 8/2014 | Taniguchi | ......... | H02M 3/33561 |
| | | | | 363/165 |
| 9,028,479 B2 * | 5/2015 | Orszulak | ............ | A61B 18/1233 |
| | | | | 330/10 |
| 9,283,028 B2 * | 3/2016 | Johnson | ............. | A61B 18/1206 |
| 9,872,719 B2 * | 1/2018 | Johnson | ............. | A61B 18/1206 |
| 2006/0017388 A1 | 1/2006 | Stevenson | | |
| 2009/0129131 A1 * | 5/2009 | Hosemans | ............ | H01J 49/022 |
| | | | | 363/89 |

(Continued)

FOREIGN PATENT DOCUMENTS

| | | |
|---|---|---|
| CN | 1505250 A | 6/2004 |
| CN | 102959857 A | 3/2013 |

(Continued)

*Primary Examiner* — Thomas J. Hiltunen
(74) *Attorney, Agent, or Firm* — Mark A. Logan; Endress+Hauser (USA) Holding, Inc.

(57) ABSTRACT

Disclosed is an HF plasma generator for generating an inductively coupled plasma in spectrometry, comprising a voltage supply device with a DC voltage source, an oscillator circuit connected to the power supply device for generating HF power, and a load circuit coupled to the oscillator circuit for generating the plasma, said load circuit having at least one induction coil and one capacitor connected in parallel. The HF plasma generator comprises at least one controllable voltage source arranged in a branch of the oscillator circuit. The controllable voltage source is designed to set a voltage applied to the load circuit and/or at least one potential difference between the induction coil and a spectrometer, in particular a cone of the spectrometer. Further disclosed is a spectrometer having an HF plasma generator.

5 Claims, 2 Drawing Sheets

(56) References Cited

U.S. PATENT DOCUMENTS

| | | | |
|---|---|---|---|
| 2011/0115562 A1* | 5/2011 | Gilbert | H03F 3/2171 |
| | | | 327/108 |
| 2012/0250370 A1* | 10/2012 | Taniguchi | H02M 3/33561 |
| | | | 363/34 |
| 2013/0020989 A1* | 1/2013 | Xia | H02M 7/2176 |
| | | | 320/109 |
| 2013/0265810 A1 | 10/2013 | Kawato | |
| 2016/0066504 A1 | 3/2016 | Holman | |
| 2022/0294346 A1* | 9/2022 | Boeke | H02M 3/06 |

FOREIGN PATENT DOCUMENTS

| | | | |
|---|---|---|---|
| CN | 108353493 A | 7/2018 |
| DE | 102007036592 A1 | 2/2009 |
| EP | 2020672 A2 | 2/2009 |

\* cited by examiner

GENERATOR FOR SPECTROMETRY

CROSS-REFERENCE TO RELATED APPLICATION

The present application is related to and claims the priority benefit of German Patent Application No. 10 2020 117 402.0, filed on Jul. 1, 2020, the entire contents of which are incorporated herein by reference.

TECHNICAL FIELD

The present disclosure relates to a high-frequency (HF) plasma generator for generating an inductively coupled plasma in spectrometry, and to a spectrometer having an HF plasma generator according to the present disclosure.

BACKGROUND

Inductively coupled plasmas are widely used in the field of spectroscopy, for example for generating ions in mass spectroscopy, or for generating a spectrum in optical emission spectroscopy.

A wide variety of HF plasma generators have become known from the prior art for generating an inductively coupled plasma, such as free-running or frequency-stabilized generators, along with generators based on high-performance tubes and those using semiconductors. In principle, a plasma generator typically comprises a voltage supply device and an oscillator circuit that is coupled to a load circuit for generating the plasma. The oscillator circuits are, for example, circuits according to Colpitts, Meienner or Huth-Kühn. However, the use of half-bridge or full-bridge circuits has also become known. Accordingly, an HF generator for spectroscopy that is based on the principle of a full-bridge circuit, with which semiconductor switching elements are used, has been disclosed in WO 2007/134363A1.

A device for generating an inductively coupled plasma further comprises one or more induction coils, which are arranged coaxially to a burner into which a gas, frequently argon gas, is introduced and heated there. A strong alternating electromagnetic field that supplies the plasma with the required energy by inductive coupling is generated in the coils by means of a high-frequency generator (HF generator). Typical temperatures of the plasma are in the range of 3,000 K-10,000 K. Frequencies for generating the alternating magnetic fields are in turn within a range of MHz to GHz, and frequently within a range between 10-50 MHz. In principle, the HF plasma generators must be able to provide sufficient power for generating and maintaining the plasma. The power is typically within a range of 500 W-3 kW. Moreover, high efficiency and high quality are desirable.

Also of particular importance is the plasma shape, which depends, inter alia, on the prevailing potentials in the vicinity of the plasma, for example a cone of the particular spectrometer, on the shape and mechanical design of the employed induction coil, and on various properties of the utilized components. In order to specifically influence the shape of the plasma, in particular the plasma core, it is appropriate, for example, to move prevailing electrical potential shifts into an analytical optimum. In this connection, although different circuit concepts have been described, which in fact establish conditions for an analytically optimum plasma shape, they are however generally static and cannot be adjusted automatically to changing conditions. A complex adaptation of the employed components along with the geometry of the plasma coil is also typically necessary in order to achieve an optimum plasma shape. Accordingly, each plasma generator is one-of-a-kind with a manufacturing process that is complex and expensive. In contrast, mass production of plasma generators, which enable an analytically optimally shaped plasma to be generated, can be realized only with great difficulty.

SUMMARY

Against this backdrop, the object of the present disclosure is to provide a plasma generator, with which an optimally shaped plasma can be produced in a simple manner.

This object is achieved by the HF plasma generator according to claim 1 and by the spectrometer according to claim 8.

With regard to the HF plasma generator, the object is achieved by an HF plasma generator for generating an inductively coupled plasma in spectrometry, comprising a voltage supply device in the form of a DC voltage source, an oscillator circuit connected to the power supply device for generating HF power, and a load circuit coupled to the oscillator circuit for generating the plasma, said load circuit having at least one induction coil and one capacitor connected in parallel to the induction coil. According to the present disclosure, the HF plasma generator, in particular the voltage supply device, comprises at least one controllable voltage source, which is arranged in a branch of the oscillator circuit, wherein the controllable voltage source is designed to set a voltage applied to the load circuit and/or at least one potential difference between the induction coil and a spectrometer, in particular a cone, for example a sampler or a skimmer, of the spectrometer.

In addition, in one possible embodiment, the plasma generator can comprise a computing unit for controlling the controllable voltage source.

The provision of a controllable voltage source allows the plasma, in particular the plasma core, to be shaped during the ongoing operation of the HF plasma generator. By specifically varying the voltage applied to the load circuit and/or at least one potential difference between the induction coil and a cone of a spectrometer, the plasma, in particular the plasma core, can be specifically compressed or stretched, or a distance to a cone of the spectrometer can also be changed. In this way, the plasma shape can accordingly be continuously optimized and, for example, corrected with regard to the analytical optimum. This enables controllable bundling of each generated ion beam.

An advantage of the present disclosure is that a deformation of the plasma with a plasma generator according to the present disclosure is possible without intervening in the components of the generator. This electronic adjustment option allows the costs and production time of the particular generator to be significantly reduced, and the analytical performance of the particular device to be optimized during ongoing operation.

In one embodiment, the oscillator circuit of the HF plasma generator comprises a bridge circuit, in particular a half-bridge circuit or a full-bridge circuit.

In this regard, it is advantageous if the bridge circuit is a full-bridge circuit having four transistors arranged in four branches, wherein each of the transistors has a gate electrode via which a gate control voltage can be applied thereto, and wherein the transistors are switched in an alternating manner to generate the HF power.

It is further advantageous if the HF plasma generator comprises a gate control circuit for generating the gate control voltage for switching the transistors.

Finally, it is advantageous with respect to the gate control circuit for it to be designed to set a predefinable value of a plasma oscillation frequency of a load oscillating circuit. The gate control circuit can preferably set the plasma oscillation frequency by using the timing of the gate control voltage, for example the gate control voltage can be a temporally periodic signal, in particular a square wave signal, by means of which the transistors can be switched on and off in a suitable manner. Such a targeted control of the gate control voltage advantageously allows both a compensation of varying plasma loads and the compensation of specific component properties. Accordingly, a reliable, analytically usable plasma can be provided in a simple manner by means of the HF plasma generator according to the present disclosure. In this connection, reference is made to the previously unpublished German patent application with application number 102020106692.9, to which full reference is made in the context of the present application.

In a further embodiment, the HF plasma generator comprises at least two controllable voltage sources, which are arranged in two different branches of the oscillator circuit.

In yet another embodiment, the HF plasma generator comprises at least four controllable voltage sources arranged in four different branches of the oscillator circuit. This embodiment is particularly advantageous in connection with an oscillator circuit designed in the form of a full-bridge circuit. In this case, a targeted adjustment option of the potentials in all four quadrants results.

The use of a plurality of, in particular structurally identical, controllable voltage sources permits a specific adjustment of the voltage applied to the load circuit and/or at least one potential difference between the induction coil and a cone of the spectrometer.

The object underlying the present disclosure is furthermore achieved by a spectrometer comprising an HF plasma generator according to the present disclosure according to at least one of the described embodiments.

In this case, it is advantageous if the spectrometer is a mass spectrometer or an optical emission spectrometer.

It should be noted that the embodiments described in connection with the HF plasma generator according to the present disclosure can also be applied mutatis mutandis to the spectrometer according to the present disclosure and vice versa.

BRIEF DESCRIPTION OF THE DRAWINGS

Further details of the present disclosure are explained with reference to the following figures. The following are shown.

In the figures, the same elements are indicated by the same reference signs.

DETAILED DESCRIPTION

Figure 1:
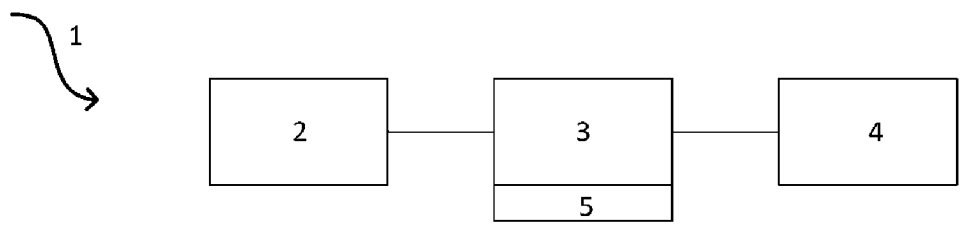
FIG. 1 shows a schematic representation of an HF plasma generator with a controllable voltage source.

FIG. 1 shows a schematic block diagram of an HF plasma generator 1 according to the present disclosure. The generator 1 comprises a voltage supply device 2 in the form of a DC voltage source, by means of which the oscillator circuit 3 is supplied. The required high-frequency power is generated by means of the oscillator circuit 3. The oscillator circuit 3 is correspondingly coupled to the load circuit 4 for generating the plasma, the load circuit 4 having the induction coil LP, which is not shown separately here, and a capacitor CP connected in parallel to the induction coil.

The HF plasma generator 1, in particular the voltage supply device 2, furthermore comprises a controllable voltage source 5, which is arranged in a branch of the oscillator circuit 3 and which is designed to set a voltage applied to the load circuit 4 and/or at least one potential difference between the induction coil, which is not shown here, and a spectrometer, likewise not shown, in particular a cone of the spectrometer.

Figure 2:
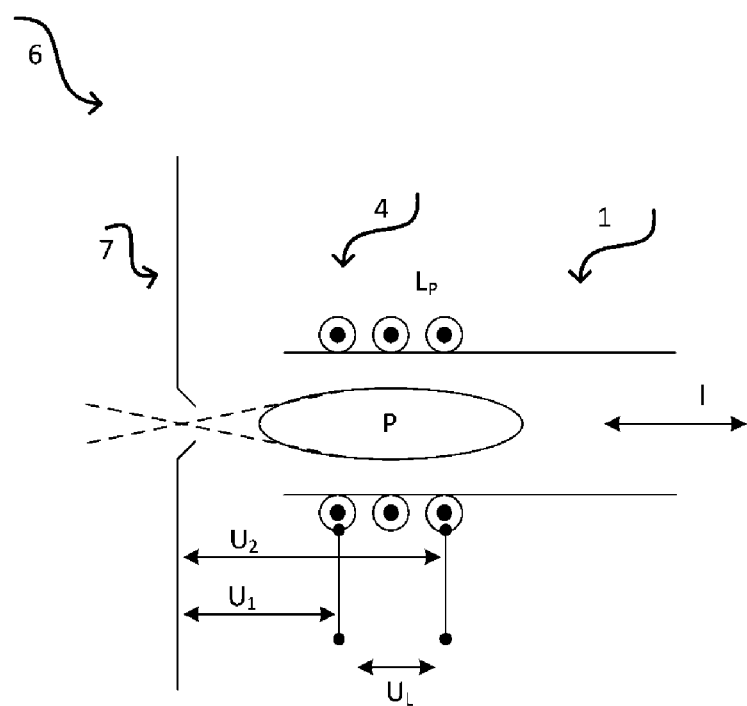
FIG. 2 shows a schematic illustration of the mode of operation of the controllable voltage source.

FIG. 2 schematically portrays the mode of operation of the controllable voltage source 5. The shape of the plasma P generated in each case, in particular the plasma core shown here, decisively depends, inter alia, on the potentials U1, U2 between the plasma coil LP and the cone 7, such as a sampler, of a spectrometer 6, with which the plasma generator 1 can be used, and also on the voltage UL applied to the load circuit 4. The plasma shape can accordingly be specifically influenced by a specific setting of one or more of these potentials. In particular, even a dynamic adaptation of the plasma shape during ongoing operation is possible.

Figure 3:
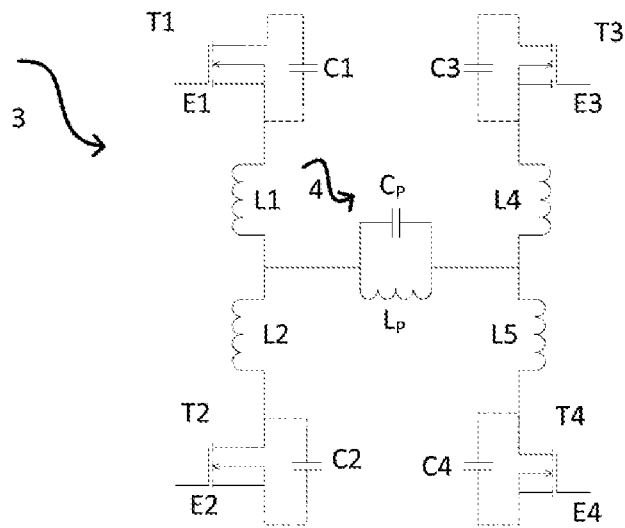
FIG. 3 shows a circuit diagram of a possible oscillator circuit in the form of a full-bridge circuit with four transistors and additional inductive elements.

An exemplary embodiment of an oscillator circuit 3 is depicted in FIG. 3. The oscillator circuit 3 comprises a full-bridge circuit consisting of four transistors T1-T4, wherein each of the transistors has a gate electrode E1-E4, via which a gate control voltage UG can be applied thereto. The transistors T1-T4 are switched in an alternating manner in order to generate the HF power for the load circuit 4 with the induction coil LP and the capacitance CP. An inductive element L1-L4 is optionally connected in series to each of the transistors T1-T4. The inductive elements L1-L4 then form a series resonant circuit in each case with the output capacitors C1-C4 of the transistors T1-T4.

Figure 4:
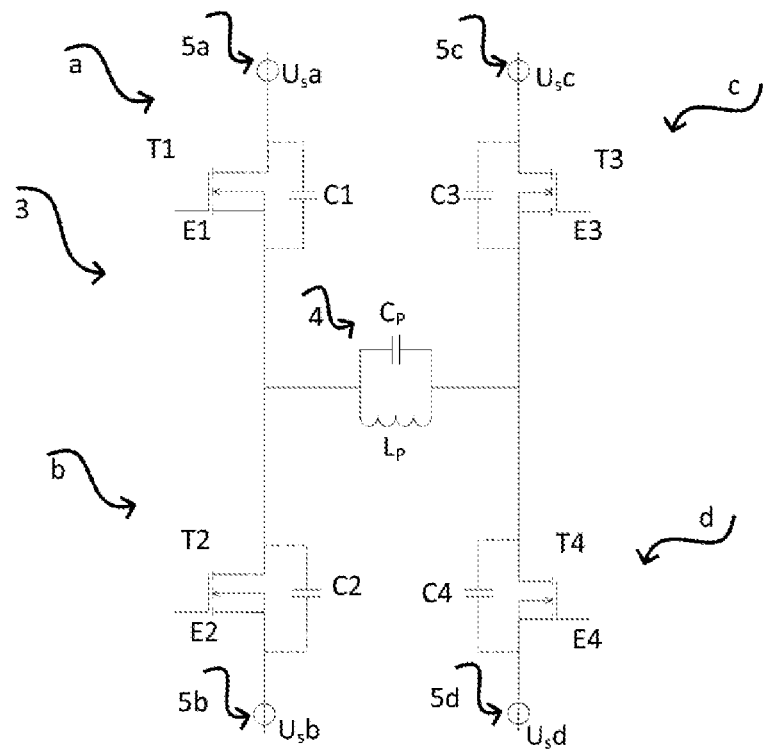
FIG. 4 shows a circuit diagram of a possible oscillator circuit according to FIG. 3 and with four controllable voltage sources.

FIG. 4 shows, by way of example, a preferred variant of the present disclosure, with which four controllable voltage sources 5a-5d are used. This may be advantageous, for example, when an oscillator circuit 3 designed as a full-bridge circuit is used. The oscillator circuit 3 shown here is designed similarly to that shown in FIG. 3. Each of the four branches a, b, c, d comprises a transistor T1-T4 and a controllable voltage source 5a-5d for generating, by means of which the voltages Usa-Usd can be generated. Optionally, it would also be conceivable in the case of FIG. 4 to use additional, series-connected inductors L1-L4, as in the case of FIG. 3.

The potentials U1, U2 between the plasma coil LP and the cone 7 along with the voltage UL applied to the load circuit 4 can be varied by means of the controlled voltage sources 5a-5d, or by means of the voltages Usa-Usd. In turn, this allows the plasma shape, especially the plasma core, to be specifically influenced, for example, stretched or compressed in parallel and/or perpendicular to a longitudinal axis 1 (see FIG. 2) by the coil LP. All this can be done without changing the other utilized components and without changing the coil geometry. In addition, a distance of the plasma core to the cone 7 of the spectrometer 6 can be adjusted appropriately. Overall, the bundling of the arising ion beam is therefore also specifically controllable by using the voltage sources 5a-5d.

In other embodiments, different numbers of controllable voltage sources 5 may also be provided. It is advantageous, but in no way absolutely necessary, if the number of branches of the oscillator circuit 3 corresponds to the utilized number of controllable voltage sources 5.

The invention claimed is:

1. A high frequency (HF) plasma generator for generating an inductively coupled plasma in spectrometry, comprising:
   an oscillator circuit, including:
      a first branch including a first transistor and a first controllable DC voltage source;
      a second branch including a second transistor and a second controllable DC voltage source;
      a third branch including a third transistor and a third controllable DC voltage source; and
      a fourth branch including a fourth transistor and a fourth controllable DC voltage source,
      wherein each of the four transistors has a gate electrode to which a gate control voltage may be applied, and
      wherein the four branches are connected in a full bridge configuration; and
   a load circuit including an induction coil and a capacitor connected in parallel, wherein the load circuit is coupled to the oscillator circuit for generating the plasma,
      wherein each of the four controllable DC voltage sources is designed to set a voltage applied to the load circuit and/or at least one potential difference between the induction coil and a spectrometer.

2. The HF plasma generator according to claim 1, further comprising:
   a gate control circuit embodied to generate the gate control voltage for switching the four transistors,
   wherein the gate control circuit is configured to switch the four transistors in an alternating manner to generate the HF power, and
   wherein the gate control circuit is further configured to set a predefinable value of a plasma oscillation frequency of the load circuit.

3. The HF plasma generator according to claim 1,
   wherein the first branch of the oscillator circuit further includes a first inductor in series with the first transistor,
   wherein the second branch of the oscillator circuit further includes a second inductor in series with the second transistor,
   wherein the third branch of the oscillator circuit further includes a third inductor in series with the third transistor, and
   wherein the fourth branch of the oscillator circuit further includes a fourth inductor in series with the fourth transistor.

4. A spectrometer comprising:
   a cone; and
   an HF plasma generator for generating an inductively coupled plasma in spectrometry, the HF plasma generator, including:
      an oscillator circuit, including:
         a first branch including a first transistor and a first controllable DC voltage source;
         a second branch including a second transistor and a second controllable DC voltage source;
         a third branch including a third transistor and a third controllable DC voltage source; and
         a fourth branch including a fourth transistor and a fourth controllable DC voltage source,
         wherein each of the four transistors has a gate electrode to which a gate control voltage may be applied, and
         wherein the four branches are connected in a full bridge configuration;
      a load circuit including an induction coil and a capacitor connected in parallel, wherein the load circuit is coupled to the oscillator circuit for generating the plasma,
         wherein each of the four controllable DC voltage sources is designed to set a voltage applied to the load circuit and/or at least one potential difference between the induction coil and the cone of the spectrometer.

5. The spectrometer according to claim 4,
   wherein the spectrometer is a mass spectrometer or an optical emission spectrometer.

* * * * *